United States Patent
Canney et al.

(10) Patent No.: US 12,524,604 B2
(45) Date of Patent: Jan. 13, 2026

(54) MANAGING CONTENT ITEMS TO FILL A CONTENT SLOT ON A WEBPAGE

(71) Applicant: Oracle International Corporation, Redwood Shores, CA (US)

(72) Inventors: Jason Canney, Broomfield, CO (US); Katie Jane Glynn, London (GB)

(73) Assignee: Oracle International Corporation, Redwood Shores, CA (US)

( * ) Notice: Subject to any disclaimer, the term of this patent is extended or adjusted under 35 U.S.C. 154(b) by 175 days.

(21) Appl. No.: 18/393,197

(22) Filed: Dec. 21, 2023

(65) Prior Publication Data

US 2025/0209255 A1   Jun. 26, 2025

(51) Int. Cl.
 *G06F 40/143* (2020.01)
 *G06N 20/00* (2019.01)
 *H04L 67/02* (2022.01)
 *H04L 67/306* (2022.01)

(52) U.S. Cl.
 CPC ........... *G06F 40/143* (2020.01); *G06N 20/00* (2019.01); *H04L 67/02* (2013.01); *H04L 67/306* (2013.01)

(58) Field of Classification Search
 CPC ....... G06F 40/143; G06F 40/14; G06N 20/00; H04L 67/02; H04L 67/306
 See application file for complete search history.

(56) References Cited

U.S. PATENT DOCUMENTS

| | | | | |
|---|---|---|---|---|
| 10,594,757 B1 * | 3/2020 | Shevchenko | ........... | H04N 7/148 |
| 11,012,233 B1 * | 5/2021 | Uhr | .......... | H04L 9/321 |
| 11,669,594 B2 * | 6/2023 | Gibb | ....... | H04L 63/10 726/28 |
| 11,900,341 B1 * | 2/2024 | Chiu | ........ | G06Q 20/3821 |
| 2011/0295694 A1 | 12/2011 | Coggeshall et al. | | |
| 2020/0184041 A1 | 6/2020 | Andon et al. | | |
| 2020/0236569 A1 | 7/2020 | Manolarakis et al. | | |
| 2020/0242212 A1 * | 7/2020 | Gibb | ........ | H04L 63/10 |
| 2021/0390196 A1 * | 12/2021 | Lavine | ........ | H04L 63/102 |
| 2022/0006651 A1 * | 1/2022 | Soundararajan | .... | H04W 12/069 |
| 2023/0079127 A1 | 3/2023 | Benedetto et al. | | |
| 2024/0143841 A1 * | 5/2024 | Lilley | ............... | G06F 21/6254 |

(Continued)

OTHER PUBLICATIONS

Elsevier, Inc., "The merchants of meta: A research agenda to understand the future of retailing in the metaverse", 2023.

(Continued)

*Primary Examiner* — Keith D Bloomquist
(74) *Attorney, Agent, or Firm* — Invoke

(57) ABSTRACT

Present invention describes a computer-implemented method for managing content to be rendered in a webpage. A web server receives a request to access a webpage. A user identifier or a device identifier is extracted from the request. The web server transmits a request for a Self Sovereign Identity (SSI) to a gatekeeper server using the identifier. The web server receives the SSI generated based on a propensity score indicating extent to which the user has propensity for releasing user's data to a digital platform. The web server extracts data about content preferences, user characteristics, or browsing history from the SSI based on data related to privacy of a user associated with the user identifier. using the data, a content item is selected to fill a content slot on the webpage. The web server configures the webpage such that the selected content item fills the content slot.

21 Claims, 9 Drawing Sheets

(56) References Cited

U.S. PATENT DOCUMENTS

2024/0212081 A1* 6/2024 Nonni .................. G06F 9/547
2025/0182161 A1* 6/2025 Verma ............... G06Q 30/0264

OTHER PUBLICATIONS

FLoC, Federated Learning of Cohorts (FLoC).
IAB Europe, "ID5", retrieved online via https://iabeurope.eu/members/id5 on Dec. 6, 2023.
ID5, "Future-proofed identification for Digital Advertising", retrieved online via https://id5.io/solutions on Dec. 6, 2023.
ID5, "ID5 and Eyeota strengthen global collaboration to empower buyers in the cookieless future", retrieved online via https://news.id5.io/2023/05/03/id5-and-eyeota-strengthen-global-collaboration-to-empower-buyers-in-the-cookieless-future on Dec. 6, 2023.
ID5, ID5 IdentityClo Future-proofed identification for Digital Advertising, retrieved online via https://id5.io on Dec. 6, 2023.
ID5, Solving the issues of privacy and user identification within digital advertising, retrieved online via https://id5.io/identity-cloud on Dec. 6, 2023.
Ramp ID, "Announcement: RampID Now the Default Identifier in Certain Destination Accounts", Sep. 15, 2022.
Rampid API, "Learn about the RampID API".
SelfKey, "Manage all your ERC20 tokens from the SelfKey Mobile App", 2017-2023.
SelfKey, "Welcome to SelfKey API".
SelfKey, "What is Self-Sovereign Identity?" 2017-2023.
The Tradedesk, "Industry Initiatives Unified ID 2.0", retrieved online via https://www.thetradedesk.com/us/about-us/industry-initiatives/unified-id-solution-2-0 on Dec. 6, 2023.
Trinsic Technologies, Inc., "Launch your IDtech product", 2023.
Unified ID, "UID2 Overview for Publishers", retrieved online via https://unifiedid.com/docs/overviews/overview-publishers on Dec. 6, 2023.

* cited by examiner

MANAGING CONTENT ITEMS TO FILL A CONTENT SLOT ON A WEBPAGE

TECHNICAL FIELD

The present invention relates to systems and methods that use Self Sovereign Identities (SSIs) to track the extent to which individual users have authorized release of one or more types of user-specific data to facilitate the filling of content slots in a user-specific manner. SSI information may further identify conditions that are to be satisfied for any such release to be authorized, where such conditions may restrict to which entities such data may be released, how content slots are filled, or a follow-up action that is to be taken, etc.

BACKGROUND

The Internet is an effective tool for commercial communication between a user device and a source entity. Communication between the source entity and the user device may be provided through a web server, but may also include additional communication ecosystems such as mobile and connected TV (CTV) applications. The web server obtains data related to the user through the user device or applications on the device and provides the data related to the user to the source entity for selection of content to be placed on the webpage hosted by the web server. The data related to the user can be accessed using cookies. For example, when a user visits or interacts with a website through a user device, the web server hosting the website provides cookies to the user device for accessing the data associated with the user. The cookies have pre-login authorization forms that either obligate the user to opt-in or opt-out of using the user's data. If the user opts-out of the cookies, the web server may prohibit the user from accessing the webpage requested by the user device. Thus, third party cookies are to be deprecated soon and are prone to breaching user's privacy.

To address the above-mentioned shortcomings of cookies, universal identifiers have been used instead of cookies. Although universal identifiers are potentially more secure than cookies, the universal identifiers do not provide a user control over their data. As a result, the universal identifiers are limited to user adoption and large scaling.

Thus, there is a need to identify a new supported and secure approach for supporting webpage customization for individual users.

SUMMARY

In some embodiments, a computer-implemented method is provided. For example, a web server may receive a web request to access a webpage. A user identifier or a device identifier may be extracted from the web request. The web server may transmit a request for a Self Sovereign Identity (SSI) to a gatekeeper server. The request may include the user identifier or the device identifier. The web server may receive the SSI generated by an adaptive machine-learning model. The SSI is generated based on a propensity score indicating an extent to which the user has propensity for releasing user's data to at least one digital platform. Further, the web server may extract content preferences, user characteristics, or browsing history from the SSI based on data related to privacy of a user associated with the user identifier. A content item may be selected to fill a content slot on the webpage using the at least one of the content preferences, the user characteristics, and the browsing history. The content item is associated with a source entity that is different than a host of the webpage. The web server may configure the webpage such that the selected content item fills the content slot. Furthermore, the web server transmits an identification of the source entity to the gatekeeper server.

In some embodiments, it may be determined that a version of a webpage with fewer content slots relative to another version of the webpage is to be availed in response to the web request. The version of the webpage is determined based on the SSI. The other version of the webpage is associated with a trigger of the request not returning the content preferences, user characteristics, or browsing history.

In some embodiments, the source entity is selected from multiple source entities based on a signal received from each of the multiple source entities. The signal comprises a resource against the at least one content slot proposed by each of the multiple source entities.

In some embodiments, a digital form of the resource may be received from the source entity. The resource is associated with the at least one content item and the at least one content slot assigned to the source entity. Further, the resource may be transferred to the gatekeeper server.

In some embodiments, the resource is associated with a pass to reduce a number of content slots on the webpage.

In some embodiments, the resource is stored in a digital container associated with at least one of the user identifier or the device identifier.

In some embodiments, the propensity score is determined based on instruction data that authorizes conditioned release of the at least one of the content preferences, the user characteristics, and the browsing history.

In some embodiments, a computer-implemented method is provided. For example, a gatekeeper server may receive a request for a Self Sovereign Identity (SSI) from a web server. The request includes the user identifier or the device identifier. The gatekeeper may further obtain data related to privacy of a user associated with the user identifier, from a user device of the user. The data related to privacy of the user indicates agreement or disagreement on sharing at least one of content preferences, user characteristics, and a browsing history. A data store is queried for instruction data using the user identifier or the device identifier and the data related to privacy of the user. The privacy of the user may be dynamically updated in the data store based on activities performed by the user on one or more media channels. The instruction data may be received from the data store as a result of the query. The instruction data authorizes conditioned release of the user preferences, the user characteristics, or the browsing history. The propensity score may be determined using an adaptive machine learning model based on the instruction data. The adaptive machine learning model is trained using user's data periodically obtained through one or more media channels. The propensity score indicates an extent to which the user has propensity for releasing the user's data to at least one digital platform. The SSI may be generated based on the propensity score. The SSI is generated for selecting at least one content item to be filled in at least one content slot on a webpage hosted by the web server. The SSI may be transmitted to the web server in response to the request.

In some embodiments, the at least one of the content preferences, the user characteristics, and the browsing history is obtained from one or more user devices associated with the at least one of the user identifier and the device identifier.

In some embodiments, at least one of the content preferences, the user characteristics, and the browsing history is periodically updated in the data store.

In some embodiments, the user is associated with multiple user identifiers or multiple device identifiers.

In some embodiments, the multiple user identifiers or the multiple device identifiers are linked to a digital container.

In some embodiments, an identification of a source entity selected from multiple source entities is received from the web server. A digital form of a resource is obtained from the source entity against a content slot on a webpage hosted by the web server. The resource is associated with the at least one content item and the at least one content slot assigned to the source entity.

In some embodiments, the resource is stored in a digital container associated with the at least one of the user identifier or the device identifier.

In some embodiments, the resource is associated with a pass to reduce a number of content slots on the webpage.

In some embodiments, the resource is utilized in multiple virtual environments.

In some embodiments, the at least one of the content preferences, the user characteristics, and the browsing history is obtained from one or more media channels to enrich metadata associated with the at least one of user identifier and the device identifier.

In some embodiments, a system is provided that includes one or more data processors and a non-transitory computer readable storage medium containing instruction which, when executed on the one or more data processors, cause the one or more data processors to perform part or all of one or more methods disclosed herein.

In some embodiments, a computer-program product tangibly embodied in a non-transitory machine-readable storage medium, including instructions configured to cause one or more data processors to perform part or all of one or more methods or processes disclosed herein.

In some embodiments, a system is provided that includes one or more means to perform part or all of one or more methods or processes disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention as claimed has been specifically disclosed by embodiments and optional features, modification and variation of the concepts herein disclosed may be resorted to by those skilled in the art, and that such modifications and variations are considered to be within the scope of this invention as defined by the appended claims.

BRIEF DESCRIPTION OF THE DRAWINGS

The present disclosure is described in conjunction with the appended figures.

DETAILED DESCRIPTION

Figure 1:
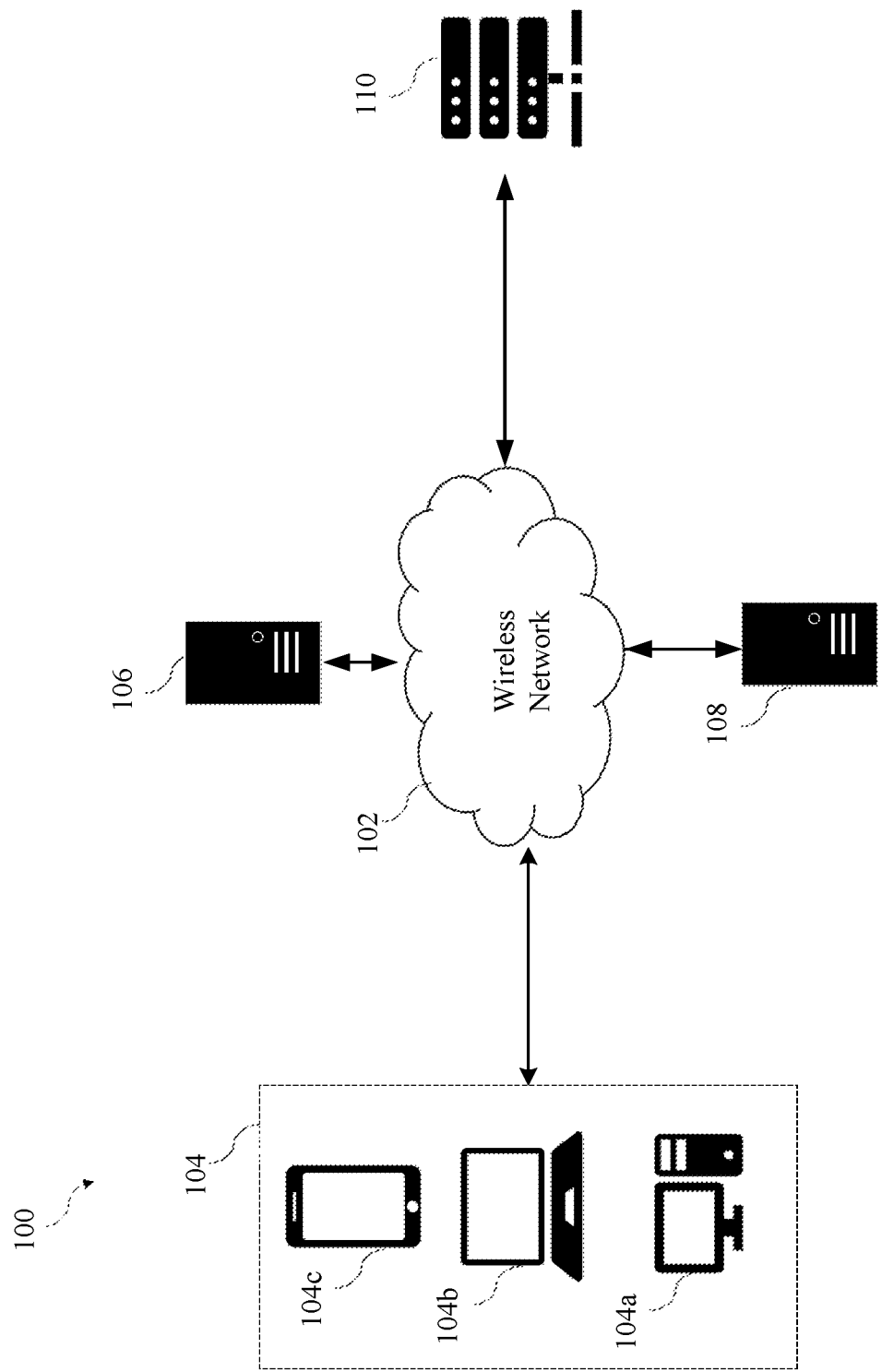
FIG. 1 is a simplified diagram illustrating a distributed system for implementing one of the embodiments.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Overview

Certain aspects and features of the present disclosure relate to managing data about content preferences, user characteristics, or browsing history. The data may be utilized to select a content to fill a content slot on a webpage accessed by a user device. The content may include content items, recommended content items, information inferred from the content items, etc. across multiple source entities. A content item may include, but is not limited to, text, images, interactive features, video, and other content that can be provided to the user device. The multiple source entities may be disjunctive with one another or may otherwise not be communicatively coupled with one another.

For accessing the webpage, a user device sends a browsing request to a web server associated with the webpage. The webpage can be a document deploying Hypertext Markup Language (HTML) formatting, or other standard formatting, and including content to be displayed by the user device. Such content includes various elements (e.g., text boxes, buttons, hyperlinks, images, animations, forms, etc.) that will appear on the user device when a web page is rendered by a web server on the user device. The web server extracts a user identifier or a device identifier from the browsing request. Such identifiers may represent, for instance, the user's identity, email address, phone number, name, physical address, identity, or the user's device. Further, the web server transmits a request for a Self Sovereign Identity (SSI) associated with the user device to a gatekeeper server.

The gatekeeper server may be a secured server that includes data related to the user, such as content preferences, user characteristics, or browsing history. Upon receiving the request for the SSI, the gatekeeper server may obtain data related to the privacy of the user. The data related to the privacy of the user indicates agreement or disagreement on sharing at least one of content preferences, user characteristics, and a browsing history. For example, the user may provide one-time preference that which data can be shared with the web server or other third-party platform. For instance, the user may desire that his/her sensitive data, such as location information should not be shared with any third-party platform. The gatekeeper server sends a query to a data store using the user identifier or the device identifier and the data related to privacy of the user. The data store comprises the data related to the user mapped with the user identifier or the device identifier. In response to the query, instruction data associated with the user identifier or the device identifier is received from the data store. The instruction data is received based on the privacy of the user. The instruction data authorizes conditioned release of content preferences, user characteristics or a browsing history. The gatekeeper server comprises a machine-learning model trained using user's data obtained from multiple media channels. The machine-learning model predicts a propensity score indicating the extent to which the user has a propensity for releasing their user's data to at least one digital platform. The machine-learning model generates the SSI for selecting one or more content items to be filled in a content slot on a webpage hosted by the web server. The SSI is generated based on the one or more items. The gatekeeper server transmits the SSI to the web server.

The web server receives the SSI from the gatekeeper server and extracts the content preferences, the user characteristics, or the browsing history. Further, the web server selects a content item to fill a content slot on the webpage using the data. The content item is associated with a source entity that is different than a host of the webpage. The web server configures the webpage such that the selected content item fills the content slot. Furthermore, an identification of the source entity is transmitted to the gatekeeper server.

Example of an Environment for Managing Data Associated with a User to Recommend Content FIG. 1 is a simplified diagram illustrating a distributed system 100 for implementing one of the embodiments. The distributed system 100 comprises various computing systems (e.g., servers and devices) interconnected by a wireless network 102. The wireless network 102 may comprise any combination of a wide area network (e.g. WAN), local area network (e.g. LAN), cellular network, wireless LAN (e.g. WLAN), or any such means for enabling communication of computing systems. The wireless network 102 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk®, etc. Merely by way of example, network(s) can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol), and/or any combination of these and/or other networks.

The distributed system 100 may comprise at least one instance of a user device 104. The user device 104 may represent one of a variety of other computing devices (e.g., a desktop computer 104a, a laptop computer 104b, a smart phone 104c, an IP phone, a tablet, etc.) having hardware and software (e.g. web browser application) capable of processing and displaying information (e.g., web page, graphical user interface, etc.), and communicating information (e.g., web page request, user activity, campaign settings, etc.) over the wireless network 102.

The user device 104 may include various types of computing systems such as Personal Assistant (PA) devices, portable handheld devices, general purpose computers such as personal computers and laptops, workstation computers, wearable devices, gaming systems, thin clients, various messaging devices, sensors or other sensing devices, etc. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®), personal digital assistants (PDAs), etc. Wearable devices may include Apple Vision Pro®, Ray-Ban® Meta Smart Glasses®, Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), etc. The client devices may be capable of executing various different applications such as various Internet-related apps, communication applications (e.g., E-mail applications, short message service (SMS) applications) and may use various communication protocols.

The distributed system 100 may further comprise a web server 106 that hosts web services accessible to the user device 104. The web server 106 may represent any single computing system with dedicated hardware and software, multiple computing systems clustered together (e.g., a server farm), a portion of shared resources on one or more computing systems (e.g., virtual server), or any combination thereof.

The web server 106 may be composed of one or more general purpose computers, specialized server computers (including, by way of example, PC (personal computer) servers, UNIX servers, mid-range servers, mainframe computers, rack-mounted servers, etc.), server farms, server clusters, or any other appropriate arrangement and/or combination. The web server 106 can include one or more virtual machines running virtual operating systems, or other computing architectures involving virtualization such as one or more flexible pools of logical storage devices that can be virtualized to maintain virtual storage devices for the server. In various embodiments, the web server 106 may be adapted to run one or more services or software applications that provide the functionality described in the foregoing disclosure.

The computing systems in the web server 106 may run one or more operating systems including any of those discussed above, as well as any commercially available server operating system. The web server 106 may also run any of a variety of additional server applications and/or mid-tier applications, including HTTP (hypertext transport protocol) servers, FTP (file transfer protocol) servers, CGI (common gateway interface) servers, JAVA® servers, database servers, etc. Exemplary database servers include without limitation those commercially available from Oracle®, Microsoft®, Sybase®, IBM® (International Business Machines), etc.

In one embodiment, the user device 104 may initiate a browsing session by sending a browsing request (e.g. web request) to the wireless network 102. The wireless network 102 may forward the browsing request to the web server 106 through a wireless connection. The web server 106 extracts a user identifier or device identifier from the browsing request.

Further, the web server 106 transmits a request for an SSI associated with the user device 104 to a gatekeeper server 108. The gatekeeper server 108 may act as a data management server that determines specialized content through data management (e.g., aggregation, analysis, matching, filtering, segmentation, etc.) of multiple data sets from various data sources (e.g., first-party, second-party, third-party, online, off-line, mobile, media, etc.). In one implementation, the gatekeeper server 108 comprises a data store that stores data related to the user, such as content preferences, user characteristics, or browsing history. The data managed by the gatekeeper server 108 can be internal data stored on and generated by the gatekeeper server 108, and/or external data and/or data received from or transmitted to the wireless network 102, or externally received from and transmitted to any combination of servers and devices in the distributed system 100.

Any activity of the user on the user device 104, such as browsing a webpage and placing a request on a digital platform can be captured as user's data and event information to the gatekeeper server 108. The gatekeeper server 108 may obtain the user's data from multiple media channels, such as television (TV), Connected television (CTV), digital web, social, and metaverse. Such data may be stored in the data store.

The gatekeeper server 108 determines the SSI using a machine-learning model. For example, the machine-learning model predicts a propensity score indicating the extent to which the user has propensity for releasing user's data to at least one digital platform. Further, the machine-learning model generates the SSI based on the propensity score.

The gatekeeper server 108 transmits the SSI to the web server 106. The SSI may be cryptographically signed. The web server 106 extracts data about content preferences, user characteristics, or browsing history from the SSI. Further, the web server 106 selects a content item to fill a content slot of the webpage. The content item may be provided by a source entity 110 that is different than the host of the webpage. Further, the webpage may be configured such that the selected content fills the content slot. The web server 106 transmits an identification of the source entity 110 to the gatekeeper server 108.

Figure 2:
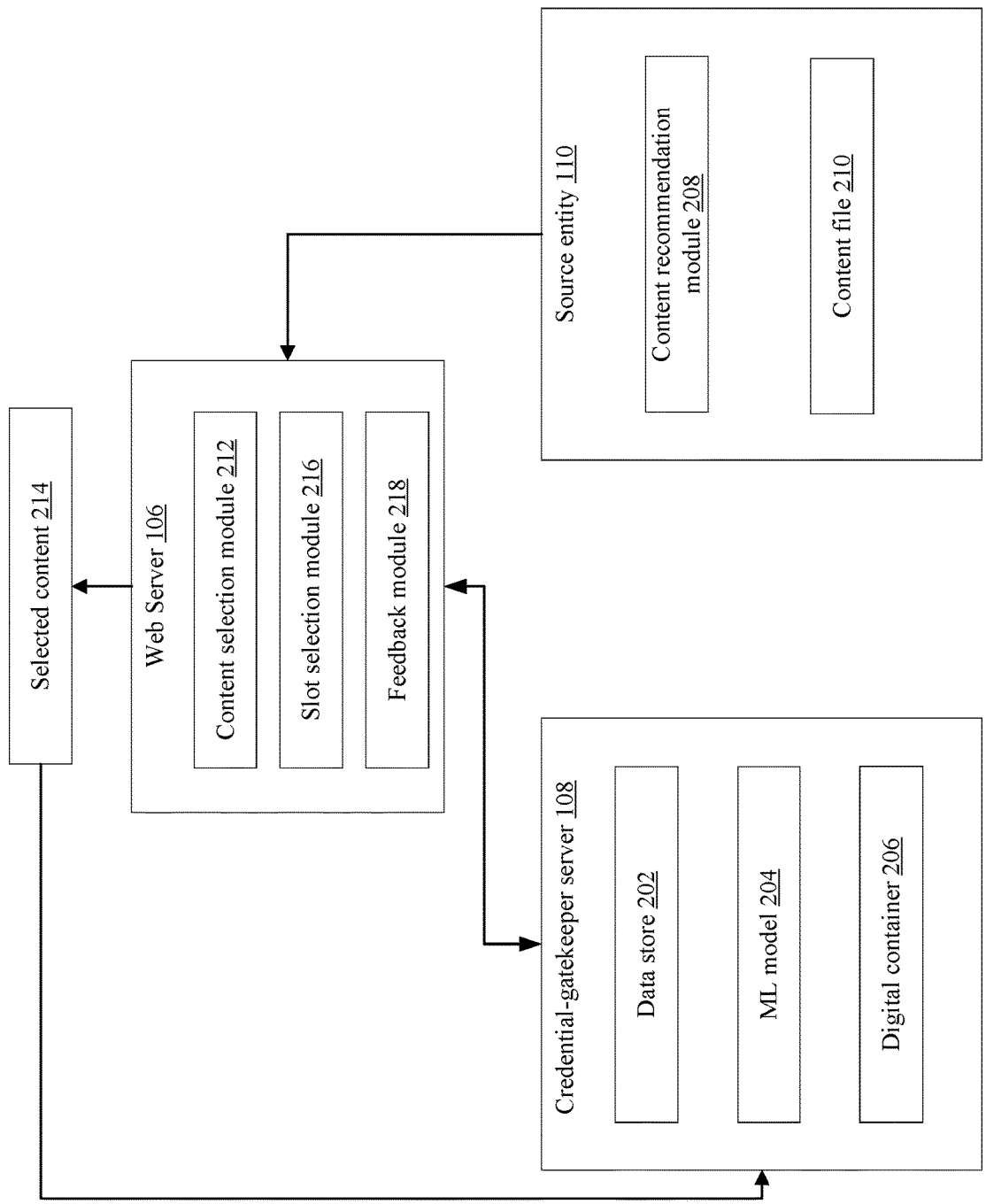
FIG. 2 is a block diagram illustrating an example of a data processing environment for managing data associated with a user to recommend content according to an embodiment.

FIG. 2 shows an exemplary block diagram illustrating a data processing environment for managing data associated with a user to recommend content according to an embodiment. As illustrated, the web server 106 is communicatively connected to the gatekeeper server 108. The web server 106 may provide a request for the SSI to the gatekeeper server 108. The gatekeeper server 108 comprises a data store 202. The data store 202 may include one or more non-transitory memory devices, including volatile and non-volatile memory devices. The data store 202 may include a number of memories including a volatile main random access memory (RAM) for storage of instructions and data during program execution and a non-volatile read only memory (ROM) or flash memory in which fixed instructions are stored. In one implementation, the data store 202 may store user metadata that indicates details related to the user, such as content preferences, user characteristics, or a browsing history. The content preferences are information associated with likes and dislikes of the user against contents rendered on the webpage. The user characteristics are personal information of the user, such as browsing habits, user location, etc. The browsing history is details of webpages browsed using the user device 104. The gatekeeper server 108 may send a query to the data store 202 based on the user identifier or the device identifier.

The gatekeeper server 108 may query the data store 202 using the user identifier or the device identifier. As a result of the query, the gatekeeper server 108 may receive instruction data associated with the user identifier or the device identifier. The instruction data may be generated based on data related to privacy of the user. The data related to privacy of the user indicates agreement or disagreement on sharing at least one of content preferences, user characteristics, and a browsing history. For example, the user may provide one-time preference that which data can be shared with the web server or other third-party platform. For instance, the user may desire that his/her sensitive data, such as location information should not be shared with any third-party platform. The instruction data may authorize conditioned release of content preferences, user characteristics, or a browsing history. The privacy of the is dynamically updated in the data store based on activities performed by the user on one or more media channels. For example, the gatekeeper server 108 may scan each media channel, such as TV, CTV, digital web, social, and metaverse and may gather the data related to the user including data related to privacy of the user for sharing the user's data with a third-party platform.

Based on the data related to privacy of the user and the user identifier or the device identifier, the data store 202 may provide instruction data. The instruction data may authorize conditioned release of at least one of content preferences, user characteristics, and a browsing history. For example, if a user provides an input to not provide his/her location and age-related data to any third-party platform, the data store provides the instruction data indicating that the location and age related data cannot be released to any third-party platform.

The gatekeeper server 108 further comprises a machine-learning (ML) model 204. One or more machine learning models are employed to evaluate and analyze data in certain embodiments, though that is not necessarily the case in every embodiment. In some cases, the security platform may also adapt more appropriately or more efficiently to the environment by using a combination of other suitable forms of analysis, including rule-based analysis, algorithm-based analysis, statistical analysis, etc. The ML model 204 may predict a propensity score indicating the extent to which the user has a propensity for releasing their data to at least one digital platform. In one implementation, the ML model 204 may be or may include an adaptive ML model, such as a multinomial logistic regression model implemented in a neural network. As such, the gatekeeper server 108 may implement supervised training of the ML model 204, as described in more detail in reference to FIG. 3. To that end, the gatekeeper server 108 may access and/or receive one or more sets of training data, which may serve as a ground truth for training the ML model 204 to predict the propensity score for a particular user.

The ML model 204 may be trained to predict a probability that an input can be mapped to one or more classes of a set of classes, corresponding to content tags or user characteristics from user metadata. As such, training the ML model 204 may include applying a supervised learning technique using one or more labeled sets of training data, which may include content tags, content objects, and user metadata, which may include user characteristics or other identifiers, such as anonymized identification numbers. Content tags may be drawn from a database of features that the feature prediction models are trained to identify. As such, the content tags may correspond to the features that may characterize content objects processed by the content system.

In some embodiments, the input to the ML model 204 may include the characteristics of a set of users, and the output of the ML model 204 may include a vector of probability values corresponding to predicted content features. In this way, the ML model 204 may be trained to map the content tags of the training data to the user metadata of the training data, and once trained, the ML model 204 may be used to generate the content-user mapping. As trained, the ML model 204 may be able to predict a propensity score indicative of the extent to which the user has propensity for releasing the user's data to at least one digital platform.

The ML model 204 may further generate the SSI associated with corresponding user based on the propensity score. The SSI provides the users with control over various user identifiers or device identifiers in the form of a digital container 206. The user may have control over the digital container 206. In one implementation, the digital container 206 may comprise multiple user identifiers or device identifiers and the user may decide which user identifier or device identifier may be shared with the digital platform. The SSI may be transmitted to the web server 106 in response to the request.

The web server 106 may further receive multiple content items from the source entity 110. The content items may be associated with products recommended for the user. The content items may be recommended using a content recommendation module 208 of the source entity. The content recommendation module 208 may acquire a list of contents from a content file 210 and may select contents based on the user metadata.

The web server 106 may comprise a content selection module 212 that selects at least one content item 214 from the multiple content items to be rendered to the user device 104. The content item may be selected based on the SSI received from the gatekeeper server 108. The content item 214 may be selected using the user metadata and the data about content preferences, user characteristics, or browsing history extracted from the SSI. For example, a user may have a preference that a specific type of content item should not be rendered on the webpage. The web server 106 may filter out those content items from the multiple content items received from the source entity 110.

The web server 106 may further comprise a slot selection module 216 for selecting at least one content slot on the webpage to be rendered to the user device 104. The content slot may be a portion on the webpage where the content item may be placed during rendering of the webpage. The web server 106 may fill at least one content slot with the content item selected by the content selection module 212. Furthermore, the web server 106 may comprise a feedback module 218 that transmits a feedback message to the gatekeeper server 108 about the selected content 214 and other information related to the selected content 214.

Figure 3:
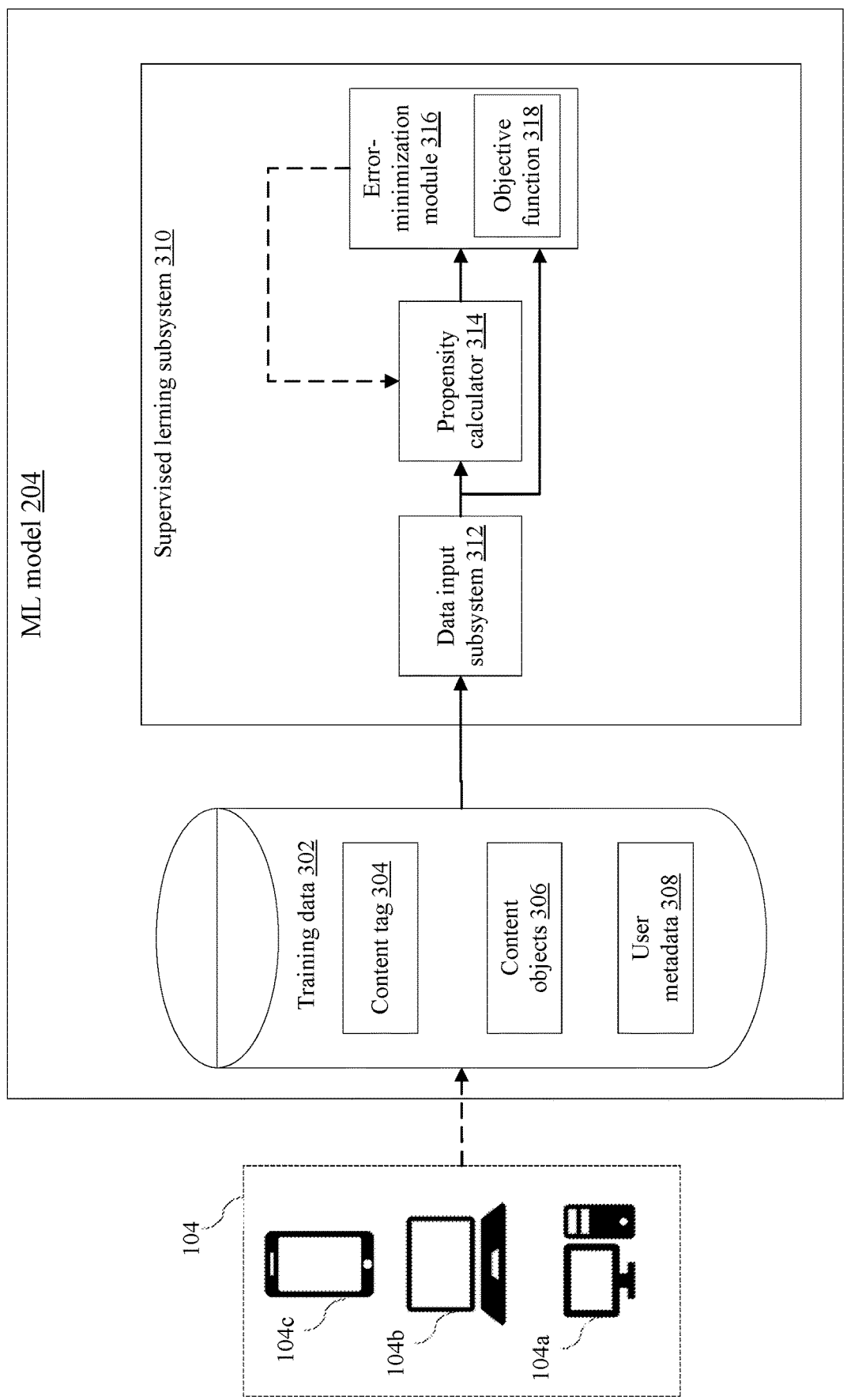
FIG. 3 is a block diagram of a ML model according to an embodiment

FIG. 3 is an exemplary block diagram of the ML model 204 according to an embodiment. More specifically, in some embodiments, The ML model 204 may be trained using training data 302. The training data 302 may be populated by data received from the user device 104. As described above, the ML model 204 may be or include a non-binary classifier, such as a multinomial logistic regression model implemented in a neural network, trained to predict a probability that an input can be mapped to one or more classes of a set of classes, corresponding to content tags 304 or user characteristics from user metadata 308. As such, training the ML model 204 may include applying a supervised learning technique using one or more labeled sets of training data 302, which may include content tags 304, content objects 306, and user metadata 308. The user metadata 308 may include user characteristics or other identifiers, such as anonymized identification numbers. The content tags 304 may be drawn from a database of features that the feature prediction models are trained to identify. As such, the content tags 304 may correspond to the features that may characterize content objects processed by the ML model 204.

The training data may be provided to a supervised learning subsystem 310. For example, the supervised learning subsystem 310 may comprise a data input subsystem 312 to receive the training data 302. As part of supervised training, the supervised learning subsystem 310 may use the training data 302 to define a ground truth, such that elements defining a mapping of the content tags 304 and user characteristics from the user metadata 308 are provided to a propensity calculator 314 and an error minimization module 316. The error minimization module 316 may, in turn, implement an objective function 318, which may be an error function, for example, defined as a distance between the model output and the ground truth. In this way, training may include adjusting one or more weights and/or coefficients of the propensity calculator 314 over multiple iterations until the value of the objective function converges to a global minimum.

In some embodiments, the input to the propensity calculator 314 includes the characteristics of a set of users, and the output includes a vector of probability values corresponding to predicted content features. In this way, the propensity calculator 314 may be trained to map the content tags 304 of the training data 302 to the user metadata 308 of the training data 302, and, once trained, the propensity calculator 314 may be used to generate the propensity score. As trained, the propensity calculator may be able to determine the propensity score indicative of the extent to which the user has propensity for releasing user's data to at least one digital platform.

In some embodiments, the supervised learning subsystem 310 may implement hyperparametric tuning, in addition to supervised learning, to optimize the ML model 204. For example, one or more terms of the objective function 318 and/or the ML model 204 may be fine-tuned by varying parameters that are not learned, such as scalar weighting factors.

Example of a Process for Controlling Content Item to be Rendered on a Webpage

Figure 4:
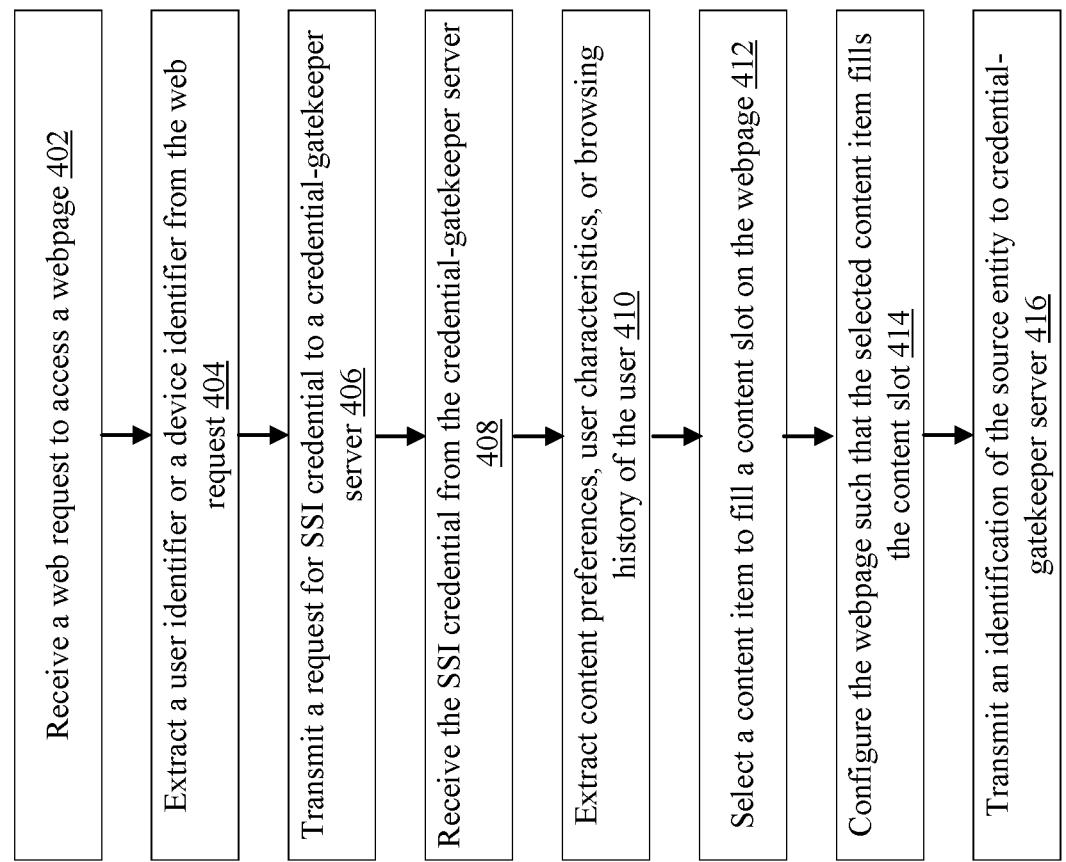
FIG. 4 is a flowchart of a process for controlling content item to be rendered on a webpage according to an embodiment.

FIG. 4 is a flowchart of a process 400 for controlling content item to be rendered on a webpage according to an embodiment. The process 400 may be performed at least in part by any of the components described in the figures herein, for example, by the web server 106 of the distributed system 100 or by the distributed system 100 itself. The process 400 can begin at block 402, when the web server 106 receives a web request to access a webpage. The web request is received from the user device 104. In some examples, the web request may be a HTTP request for accessing the webpage. The HTTP request may comprise an IP address of the webpage.

At block 404, the web server 106 extracts a user identifier or a device identifier from the web request. The user identifier or the device identifier may indicate an identity of the user or user device. In some examples, the user identifier or the device identifier may be a 64- or 128-bit datum used to uniquely identify some object or entity on the Internet. The user identifier or the device identifier is unique across both space and time defined using cryptographic-quality random numbers. The user identifier or the device identifier are standardized by the Open Software Foundation (OSF) as part of a Distributed Computing Environment (DCE). It relies upon a combination of components to ensure uniqueness. In its canonical textual representation, the 16 octets of a user identifier or a device identifier are represented as 32 hexadecimal (base-16) digits, displayed in 5 groups separated by hyphens, in the form 8-4-4-4-12 for a total of 36 characters (32 alphanumeric characters and 4 hyphens). In an example of xx xxxxxx-xxxx-Mxxx-Nxxx-xxxxxxxxxxxx, the 4 bits of digit M indicate a version of the user identifier or the device identifier, and the 1-3 most significant bits of digit N indicate a variant of the user identifier or the device identifier.

At block 406, the web server 106 transmits a request for an SSI to the gatekeeper server 108. The request comprises the user identifier or the device identifier. The gatekeeper server 108 identifies the SSI corresponding to the user identifier or the device identifier from the data store 202. Further, the gatekeeper server 108 may extract the metadata of the corresponding user. The metadata may comprise multiple attributes associated with the user, such as data about content preferences, user characteristics, or browsing history. The user may provide one-time input for accessing the metadata associated with the user. In an instance, the user may select some of the attributes, such as purchase areas (groceries) that cannot be shared with any third-party vendor. In such instances, the gatekeeper server 108 does not share the attributes related to the purchase areas (groceries) even if the web server 106 has requested to share attributes of the metadata. In such way, the user may control which portion of his/her information to be shared with the third-party vendor.

The gatekeeper server 108 may utilize the ML model 204 for determining a propensity score indicating an extent to which the user has propensity for releasing user's data to at least one digital platform. The propensity score is determined based on instruction data that authorizes conditioned release of at least one of the content preferences, the user characteristics, and the browsing history. Further, the gatekeeper server 108 may utilize the ML model 204 for generating the SSI based on the propensity score.

At block 408, the web server 106 receives the SSI from the gatekeeper server 108. The SSI is cryptographically signed to ensure privacy of the data present in the SSI. Further, the web server 106 may authenticate the user device 104 based on the SSI.

At block 410, the web server 106 extracts the content preferences, user characteristics, or browsing history from the SSI. The content preferences are information associated with likes and dislikes of the user against contents rendered on the webpage. The user characteristics indicate personal information of the user, such as browsing habits. The browsing history indicates information about websites that were recently accessed by the user device.

At block 412, the web server 106 selects at least one content item to fill at least one content slot on the webpage. The content item may be selected from multiple contents provided by the source entity 110. The source entity 110 is different than a host of the webpage. The web server 106 selects the content item based on the data received from the gatekeeper server 108. For example, if the user has opted out a particular type of content, then the web server 106 blocks such content and selects other contents to be rendered at the content slot on the webpage.

At block 414, the web server 106 configures the webpage such that the selected content item fills the content slot.

Further, the webpage is rendered to the user device 104. The webpage does not include content items which are opted out by the user. In such way, a number of content items rendered on the webpage get reduced.

At block 416, the web server 106 transmits an identification of the source entity 110 to the gatekeeper server 108. The gatekeeper server 108 updates the data store 202 based on the identification of the source entity 110. The identification of the source entity 110 may be utilized in processing a resource against the metadata of the user. Details pertaining to processing of resource are described in successive section of the disclosure.

Example of a Process for Providing SSI

Figure 5:
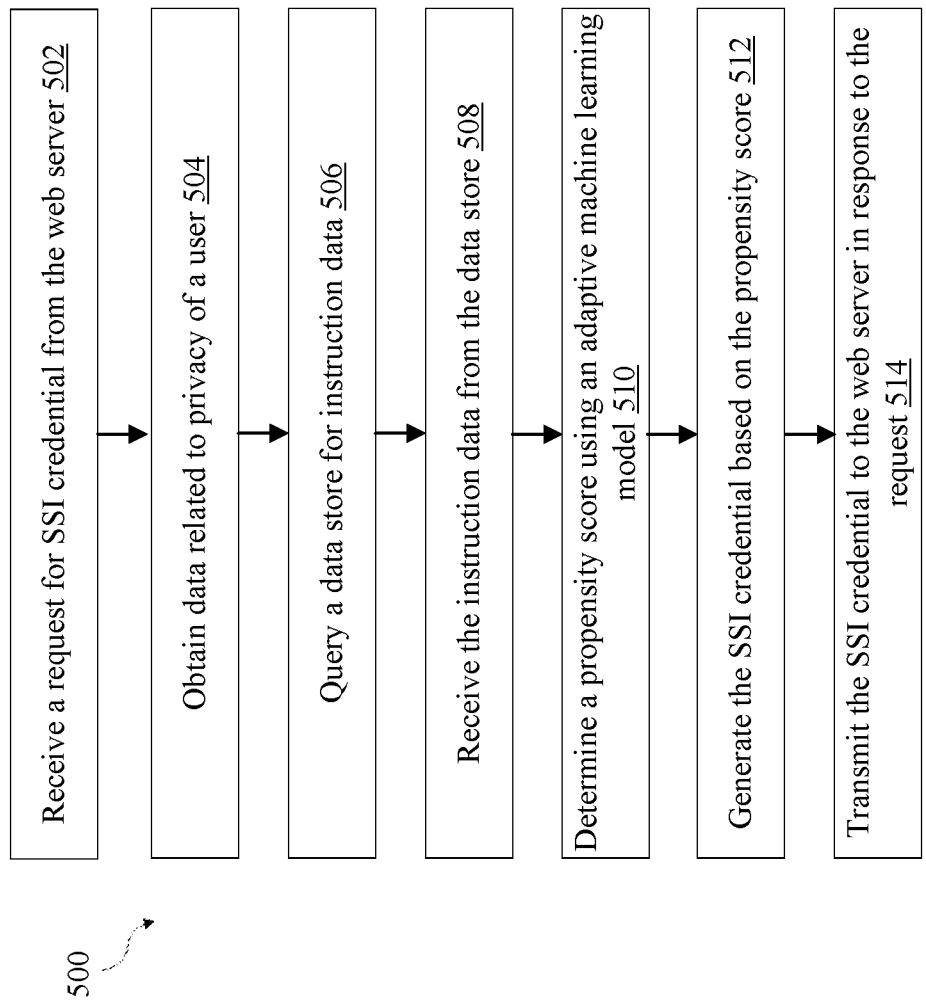
FIG. 5 is a flowchart of a process for providing SSI according to an embodiment.

FIG. 5 is a flowchart of a process 500 for providing SSI according to an embodiment. The process 500 may be performed at least in part by any of the components described in the figures herein, for example, by the gatekeeper server 108 of the distributed system 100 or by the distributed system 100 itself. The process 500 can begin at block 502, when the gatekeeper server 108 receives a request for SSI from the web server 106. The request includes a user identifier or a device identifier. The user identifier or the device identifier is obtained from a web request sent from the user device 104.

At block 504 the gatekeeper server 108 obtains data related to privacy of a user associated with the user identifier. The data may be received from the user device 104. The data related to privacy of the user indicates agreement or disagreement on sharing at least one of content preferences, user characteristics, and a browsing history. For example, the user may provide one-time preference that which data can be shared with the web server 106 or other third-party platform. For instance, the user may desire that his/her sensitive data, such as location information should not be shared with any third-party platform.

At block 506, the gatekeeper server 108 queries a data store for instruction data using data related to privacy of the user, the user identifier, and/or the device identifier. The data store may comprise metadata associated with users. The metadata may comprise multiple attributes associated with the user, such as data about content preferences, user characteristics, or browsing history. The privacy of the user is dynamically updated in the data store based on activities performed by the user on one or more media channels.

At block 508, the gatekeeper server 108 receives instruction data associated with the user identifier or the device identifier. The instruction data authorizes conditioned release of the user preferences, the user characteristics, or the browsing history. The user may provide one-time input for accessing the metadata associated with the user. In an instance, the user may select some of the attributes, such as purchase areas (groceries) that cannot be shared with any third-party vendor. In such instances, the gatekeeper server 108 does not share the attributes related to the purchase areas (groceries) even if the web server 106 has requested to share attributes of the metadata. In such a way, the user may control which portion of his/her information is to be shared with the third-party vendor. The conditioned release enables the gatekeeper server to publish the data about content preferences, user characteristics, or browsing history based on the data related to privacy of the user.

At block 510, the gatekeeper server 108 may determine a propensity score using an adaptive ML model. The adaptive ML model may be trained using user's data periodically obtained through one or more media channels. The propensity score may indicate the extent to which the user has propensity for releasing the user's data to at least one digital platform.

At block 512, the gatekeeper server 108 may generate the SSI based on the propensity score. The SSI may comprise data about content preferences, user characteristics, or browsing history. The information which is opted out by the user is not included in the SSI. The SSI may be generated for selecting at least one content item to be filled in at least one content slot on a webpage hosted by the web server.

At block 514, the gatekeeper server 108 may transmit the SSI to the web server 106 in response to a request. The SSI is cryptographically signed to ensure privacy of the data present in the SSI. Thus, the gatekeeper server 108 releases the information to the web server 106 based on the data related to privacy of the user. In such a way the user controls his/her data through the gatekeeper server 108.

Further, a single user may have multiple user identifiers or device identifiers. For example, the user can create different user identifiers for different platforms, such as linear TV, CTV, Digital web, social, and the metaverse. Also, the user may use multiple devices to login into the webpage at different time instances. For example, the user may use a desktop computer 104a to login into the webpage in one instance, a laptop computer 104b in second instance, and a smart phone 104c in a third instance. In such a scenario, the single user may have multiple device identifiers. Thus, it becomes difficult to manage user identifiers and device identifiers. Embodiments of the present invention provide a centralized platform (digital container) where the user identifiers and the device identifiers are combined.

Figure 6:
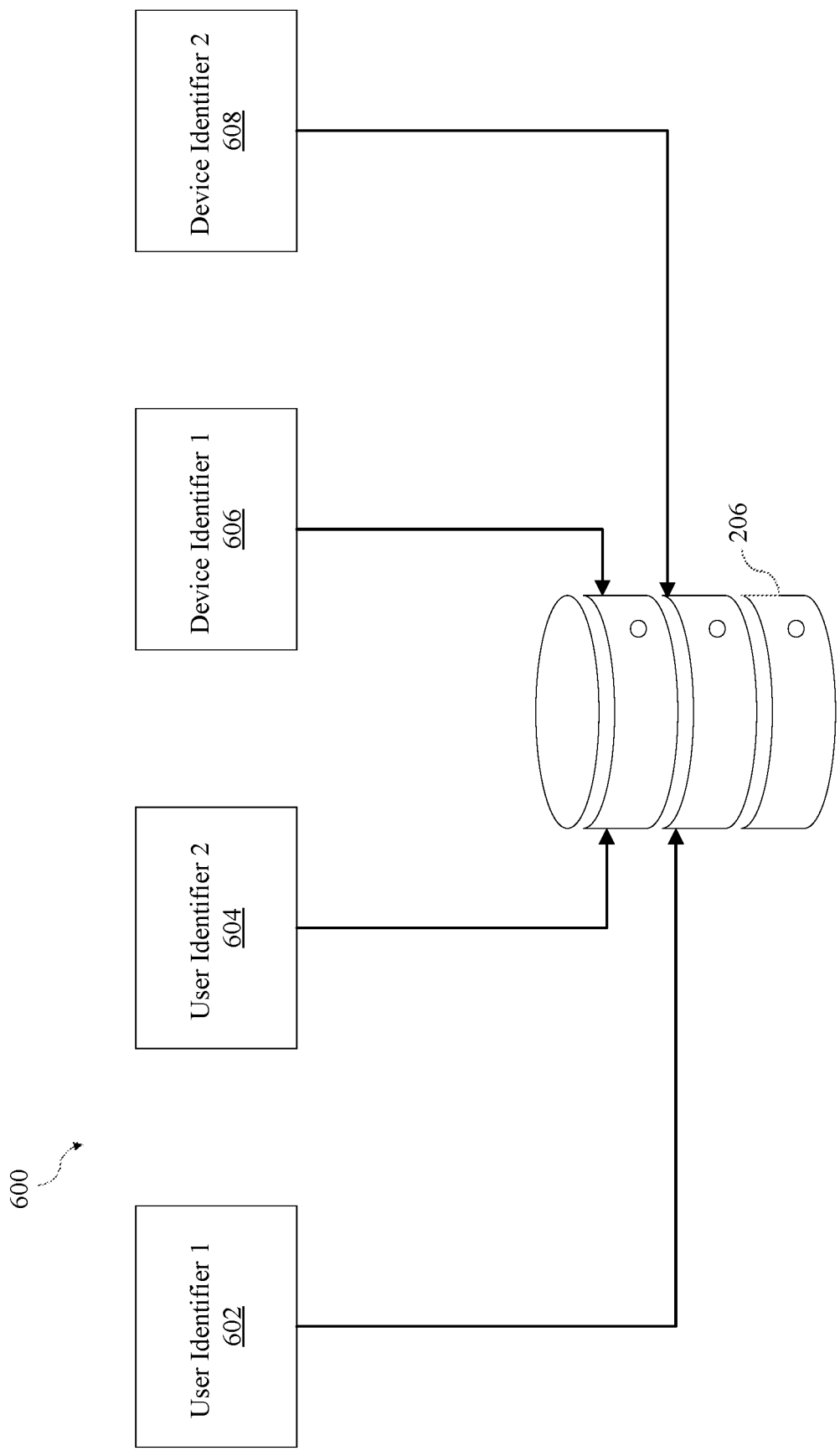
FIG. 6 is an example of a data flow diagram for managing user identifiers and device identifiers according to an embodiment.

FIG. 6 is an example of a data flow diagram 600 for managing user identifiers and device identifiers according to an embodiment. The gatekeeper server 108 may comprise the digital container 206 for managing the user identifiers and the device identifiers associated with the user. The digital container 206 may be an SSI container that stores digital form of a document, such as a driver's license, a college degree, etc. The digital container 206 may be configured to further store multiple identifiers like user identifiers and device identifiers. As illustrated in FIG. 6, multiple user identifiers, such as first user identifier 602 and second user identifier 604 and multiple device identifiers, such as first device identifier 606 and second device identifier 608 may be linked to the digital container 206.

The digital container 206 stores data related to all identifiers at a single entity. The user is enabled to control the digital container 206 according to his/her preferences. For example, the user may provide one-time input to the digital container 206 which is applicable to all identifiers associated with the user.

Figure 7:
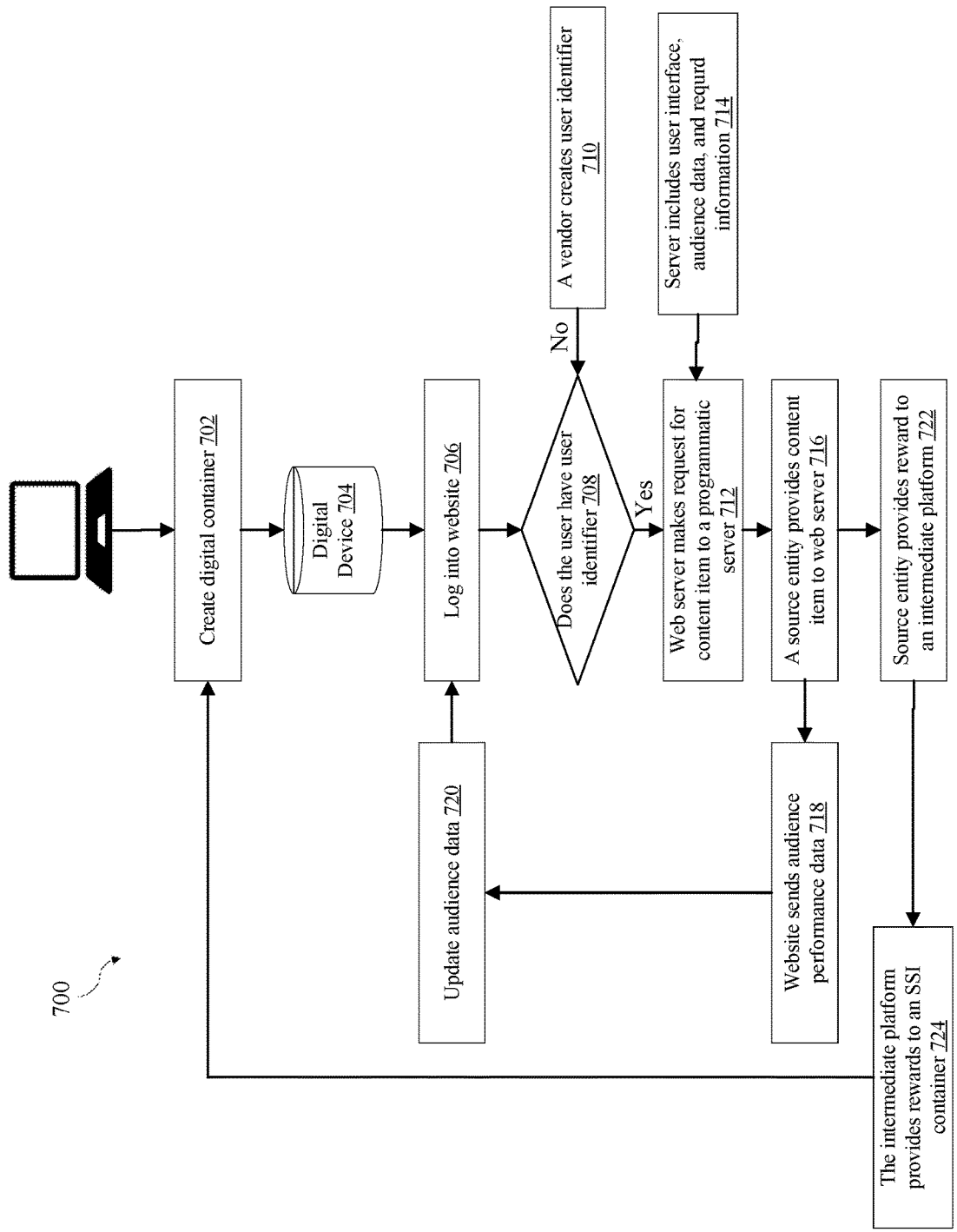
FIG. 7 is a flowchart of a process for providing a transaction amount for accessing the metadata of the user according to an embodiment.

FIG. 7 illustrates a flowchart of a process 700 for providing a transaction amount for accessing the metadata of the user according to an embodiment. At block 702, the user creates a digital container 206 using the user device 104. In one implementation, the digital container 206 may be an SSI container. In one embodiment, the SSI container may be stored and processed in a cloud server. The cloud server may comprise an interface configured to receive a signed instruction to store the metadata of the user. The instruction is signed based on a user private key of a user asymmetric key pair. The user private key may be stored on the user device 104. The cloud server further comprises a trusted execution environment configured to verify the signed instruction based on a user public key of the user asymmetric key pair. The trusted execution environment is further configured to store the metadata if the signed instruction is approved.

When the signed instruction is approved, the digital container 206 may be created in the cloud server. The digital container 206 may include, e.g., an electronic device, a data storage, an online service, and/or a software program configured to manage the metadata of the user. The digital container 206 may generate, store, and manage Decentralized Identifiers (DIDs) that are used similarly to digital identifiers for conventional digital identities. In contrast to the conventional digital identity, the digital container 206 allows the user to control his/her digital identity. Therefore, the digital container 206 is solely accessible by the user, or entities or mechanisms that are authorized by the user.

At block 704, the user may link the digital container 206 to a resource providing service platform to send and receive resources. In one implementation, the resource providing service platform may be Google Pay® service, Apple Pay® service, Venmo®, Cash App®, and/or a crypto wallet. Further, the user may link the digital container 206 to a data management server present in the gatekeeper server 108. The data management server may utilize information associated with the digital container 206 to monetize user's data for selection of content items.

At block 706, the user device 104 may access a web service through the wireless network 102. For example, the user may log onto a website. The website may comprise a webpage that is a document deploying HTML formatting, or other such known or standard formatting, and including content to be displayed by the user device 104. Such web page content defines the various elements (e.g., text boxes, buttons, hyperlinks, images, animations, forms, etc.) that will appear on the user device 104 when a web page is rendered by a web browser on the user device 104.

At block 708, it may be determined whether the user has a user identifier, such as a universal identity (UID) or not. If the user does not have a user identifier or a device identifier, a vendor may create a user identifier or device identifier for the user, at block 710.

At block 712, the web server 106 generates a request for content items using the user identifier or a device identifier. At block 714, the web server 106 may include at least one parameter to the request for the content items. In one implementation, at least one parameter may include the user identifier or device identifier, audience data, and a prescribed resource associated with user metadata. The audience data is information associated with a group of users directly or indirectly related to the user. The user metadata is information related to their previous purchase history, the user's preferences, and the browsing history, etc.

Further, the request for the content items may be provided to multiple source entities. For example, the web server 106 may send the request to a programmatic server to enable the source entities to place an order for the content slot available on the webpage. The source entities may place their order against the request. At block 716, the web server 106 selects one or more source entities from the multiple source entities based on their order. For example, the source entities who placed the order of a value greater than or equal to the prescribed resource associated with the user data may be selected by the web server 106.

Further, the source entity selected in the above step may utilize the user metadata to select content items to be rendered on the webpage. At block 718, the web server 106 sends audience performance data to a data management platform for further processing. The data management platform may utilize the audience performance data to enrich the audience data, at block 720.

At block 722, the resource received for the user data may be transferred from the source entity to an intermediate platform. The intermediate platform acts as a bridge between the user device 104 and the source entities. Usage of the intermediate platform between the user device 104 and the source entities maintain the privacy of the user. At block 724, the resource may be transferred from the intermediate platform to the digital container 206. The user may utilize the received resource for getting an item in a virtual environment. In one implementation, the resource is associated with a pass to reduce a number of content slots on the webpage.

Figure 8:
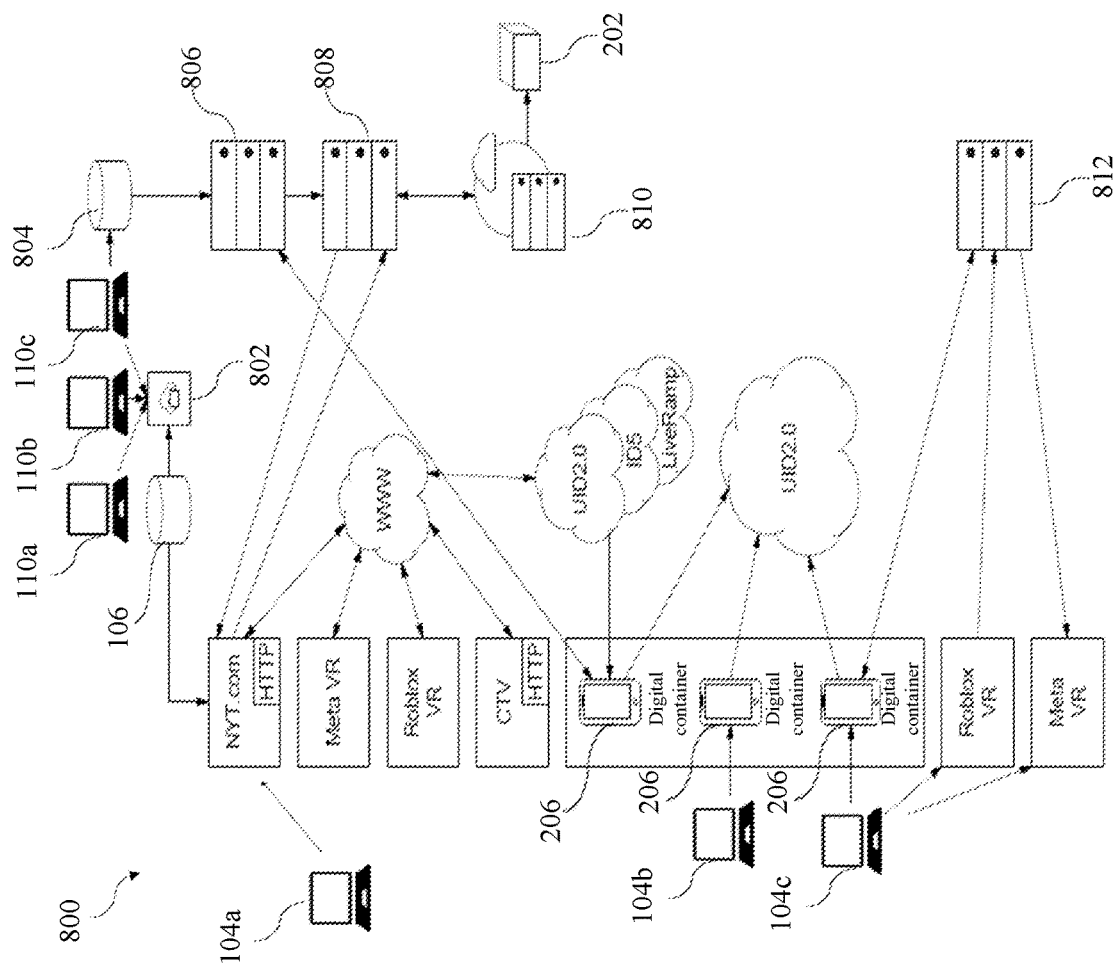
FIG. 8 is a process architecture of a computing environment according to an embodiment.

FIG. 8 is a process architecture 800 of a computing environment according to an embodiment. The process starts when a user device 104 initiates a web request for browsing a webpage. The request may be received by a web server 106 hosting the webpage. For example, the user device 104 sends a request to visit a website, such as NYT.com. In such case, the web server 106 asks the user device 104 to login using a user identifier or a device identifier. In a case when the user device 104 does not have a user identifier or a device identifier, a new user identifier or a new device identifier may be created using information received from the user device 104. Further, the new user identifier or device identifier may be mapped to a digital container 206. In an alternate case, when the user device is associated with the user identifier or device identifier, the credentials received from the user device 104 may be authenticated by the web server 106. In some embodiments, the user may delete the user identifier and the device identifier using the user device 104.

The web server 106 transmits a request for SSI to a gatekeeper server 108. The request may comprise the user identifier and the device identifier. In response to the request, the web server 106 may receive the SSI from the gatekeeper server 108. The SSI may be generated based on a propensity score using an adaptive machine learning model. The adaptive machine learning model may be trained using user's data periodically obtained through one or more media channels. The propensity score may be determined based on instruction data that authorizes conditioned release of user preferences, user characteristics, or browsing history. The conditioned release enables the gatekeeper server 108 to publish the data about content preferences, user characteristics, or browsing history based on the data related to privacy of the user. In some embodiments, the user may provide preference that which data can be shared, and which data cannot be shared with a third-party platform. The gatekeeper server 108 may build a database including details related to users obtained from multiple platforms, such as TV, CTV, digital web, social media, and the metaverse.

The web server 106 may transmit a content request to multiple source entities 110, such as McDonalds® 110a, Ford® 110b, and Kroger® 110c. The content request may be published on a programmatic server 802. Each source entities 110 may provide a signal to the programmatic server 802. The signal may comprise a resource against at least one content slot proposed by each of the multiple source entities. The programmatic server 802 may select a source entity 110 based on a value of the resource. For example, a source entity 110 having the value of the resource highest among the multiple source entities 110 is selected for providing content of a webpage hosted by the web server 106.

The source entity 110 may provide contents to the web server 106. The web server 106 may select a content item from the contents provided by the source entity 110. The content item may be selected based on the SSI received from the gatekeeper server 108. In particular, the content item may be selected based on data about content preferences, user characteristics, or browsing history extracted from the SSI. Further, the web server 106 may configure the webpage such that a content slot is filled by the content item. The webpage may be rendered to the user device 104.

The source entity 110 selected by the programmatic server 802 may provide the value of the resource to a digital platform 804 acting as an intermediate platform to temporarily store details about the transaction amount. Further, the digital platform 804 may transfer the resource to the digital container 206 through a dedicated platform 806 implemented on a blockchain network.

The details about the resource may be stored in a data management platform 808 maintained by the gatekeeper server 108. The data management platform 808 may utilize the details about the resource to build metadata for the user. The metadata of the user may be built using an audience builder algorithm 810. In such a way the gatekeeper server 108 is able to build a richer database for the user. Further, the metadata may be stored in the data store 202.

The user may utilize the resource into different virtual environments 814, such as different metaverses. For example, the user may obtain an item using the resource in a first metaverse. The user may utilize the item purchased in the first metaverse in a second metaverse through login within the second metaverse using the user identifier or device identifier.

Figure 9:
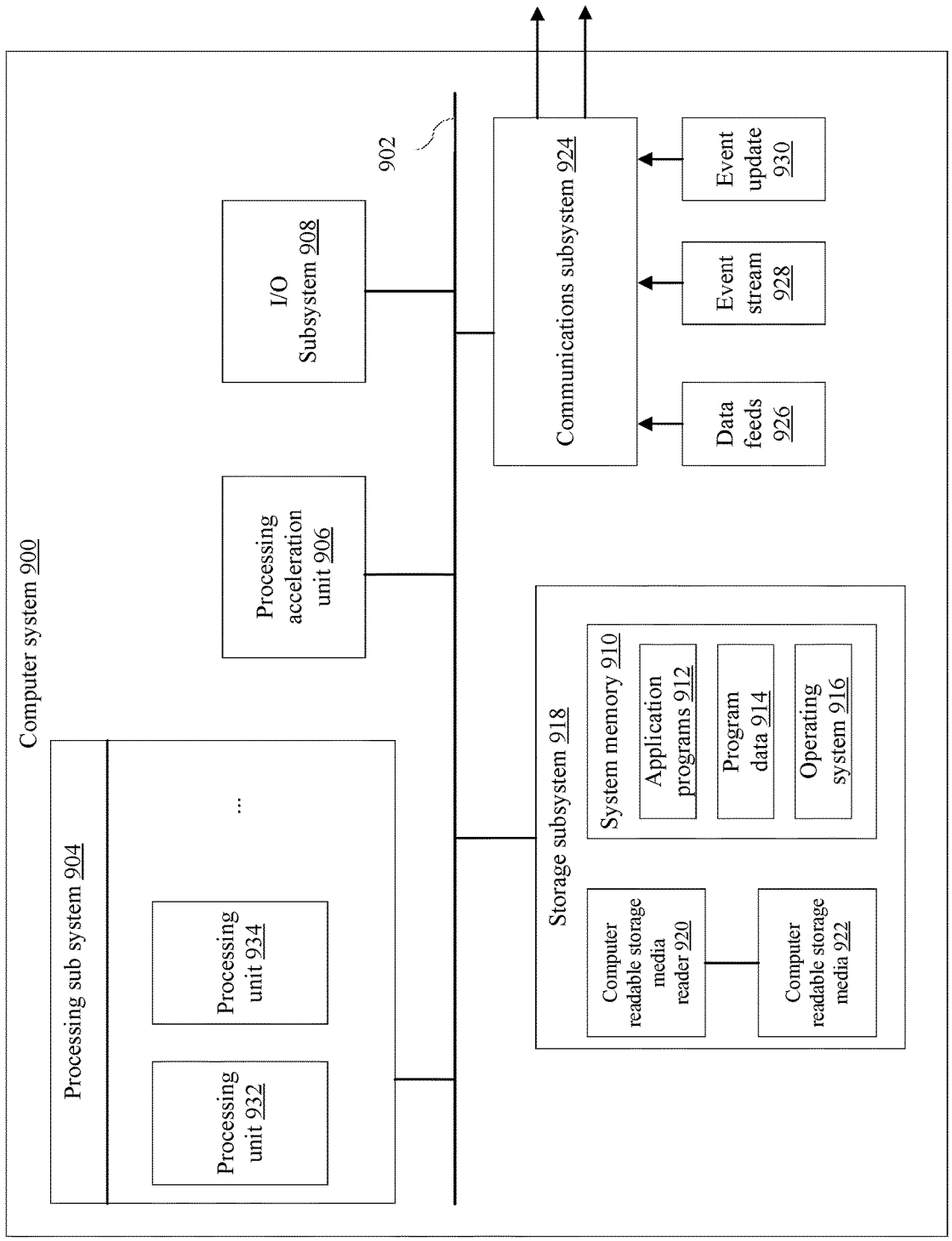
FIG. 9 is a block diagram of an example computer system that may be used to implement certain embodiments.

FIG. 9 is a block diagram of an example computer system 900 that may be used to implement certain embodiments. For example, in some embodiments, the computer system 900 may be used to implement any of the systems, subsystems, and components described herein. For example, multiple host machines may provide and implement processes of a distributed system 100 as described herein. Computer systems such as the computer system 900 may be used as host machines. As shown in FIG. 9, the computer system 900 includes various subsystems including a processing subsystem 904 that communicates with a number of other subsystems via a bus subsystem 902. These other subsystems may include a processing acceleration unit 906, an I/O subsystem 908, a storage subsystem 918, and a communications subsystem 924. Storage subsystem 918 may include non-transitory computer-readable storage media 922 including a storage media and a system memory 910.

Bus subsystem 902 provides a mechanism for letting the various components and subsystems of the computer system 900 communicate with each other as intended. Although bus subsystem 902 is shown schematically as a single bus, alternative embodiments of the bus subsystem may utilize multiple buses. Bus subsystem 902 may be any of several types of bus structures including a memory bus or memory controller, a peripheral bus, a local bus using any of a variety of bus architectures, etc. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, etc.

Processing subsystem 904 controls the operation of the computer system 900 and may comprise one or more processors, application specific integrated circuits (ASICs), or field programmable gate arrays (FPGAs). The processors may include a single core or multicore processors. The processing resources of the computer system 900 can be organized into one or more processing units 932, 934, etc. A processing unit may include one or more processors, one or more cores from the same or different processors, a combination of cores and processors, or other combinations of cores and processors. In some embodiments, processing subsystem 904 can include one or more special purpose co-processors such as graphics processors, digital signal processors (DSPs), etc. In some embodiments, some or all of the processing units of processing subsystem 904 can be implemented using customized circuits, such as application specific integrated circuits (ASICs), or field programmable gate arrays (FPGAs).

In some embodiments, the processing units in processing subsystem 904 can execute instructions stored in system memory 910 or on computer-readable storage media 922. In various embodiments, the processing units can execute a variety of programs or code instructions and can maintain multiple concurrently executing programs or processes. At any given time, some or all of the program code to be executed can be resident in system memory 910 and/or on computer-readable storage media 922 including potentially on one or more storage devices. Through suitable programming, processing subsystem 904 can provide various functionalities described above. In instances where the computer system 900 is executing one or more virtual machines, one or more processing units may be allocated to each virtual machine.

In certain embodiments, a processing acceleration unit 906 may optionally be provided for performing customized processing or for off-loading some of the processing performed by processing subsystem 904 to accelerate the overall processing performed by the computer system 900.

I/O subsystem 908 may include devices and mechanisms for inputting information to the computer system 900 and/or for outputting information from or via the computer system 900. In general, use of the term input device is intended to include all possible types of devices and mechanisms for inputting information to the computer system 900. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as a blink detector that detects eye activity (e.g., "blinking" while taking pictures and/or making a menu selection) from users and transforms the eye gestures as inputs to an input device (e.g., Apple Vision Pro®, Ray-Ban® Meta Smart Glasses®, Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments, etc.

In general, use of the term output device is intended to include all possible types of devices and mechanisms for outputting information from the computer system 900 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, etc. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 918 provides a repository or data store for storing information and data that is used by the computer system 900. Storage subsystem 918 provides a tangible non-transitory computer-readable storage medium for storing the basic programming and data constructs that provide the functionality of some embodiments. Storage subsystem 918 may store software (e.g., programs, code modules, instructions) that when executed by processing subsystem 904 provides the functionality described above. The software may be executed by one or more processing units of processing subsystem 904. Storage subsystem 918 may also provide a repository for storing data used in accordance with the teachings of this disclosure.

Storage subsystem 918 may include one or more non-transitory memory devices, including volatile and non-volatile memory devices. As shown in FIG. 9, storage subsystem 918 includes a system memory 910 and a computer-readable storage media 922. System memory 910 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within the computer system 900, such as during start-up, may typically be stored in the ROM. The RAM typically contains data and/or program modules that are presently being operated and executed by processing subsystem 904. In some implementations, system memory 910 may include multiple different types of memory, such as static random access memory (SRAM), dynamic random access memory (DRAM), etc.

By way of example, and not limitation, as depicted in FIG. 9, system memory 910 may load application programs 912 that are being executed, which may include various applications such as Web browsers, mid-tier applications, relational database management systems (RDBMS), etc., program data 914, and an operating system 916. By way of example, operating system 916 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, etc) and/or mobile operating systems such as iOS, Windows® Phone, Android® OS, BlackBerry® OS, Palm OS operating systems, and others.

In certain embodiments, software instructions or code implementing the distributed system 100, as described herein, may be executed in system memory 910.

Computer-readable storage media 922 may store programming and data constructs that provide the functionality of some embodiments. Computer-readable storage media 922 may provide storage of computer-readable instructions, data structures, program modules, and other data for the computer system 900. Software (programs, code modules, instructions) that, when executed by processing subsystem 904 provides the functionality described above, may be stored in storage subsystem 918. By way of example, computer-readable storage media 922 may include non-volatile memory such as a hard disk drive, a magnetic disk drive, an optical disk drive such as a CD ROM, DVD, a Blu-Ray® disk, or other optical media. Computer-readable storage media 922 may include, but is not limited to, Zip® drives, flash memory cards, universal serial bus (USB) flash drives, secure digital (SD) cards, DVD disks, digital video tape, etc. Computer-readable storage media 922 may also include, solid-state drives (SSD) based on non-volatile memory such as flash-memory based SSDs, enterprise flash drives, solid state ROM, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain embodiments, storage subsystem 918 may also include a computer-readable storage media reader 920 that can further be connected to computer-readable storage media 922. Computer-readable storage media reader 920 may receive and be configured to read data from a memory device such as a disk, a flash drive, etc.

In certain embodiments, a computer system 900 may support virtualization technologies, including but not limited to virtualization of processing and memory resources. For example, the computer system 900 may provide support for executing one or more virtual machines. In certain embodiments, the computer system 900 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by the computer system 900. Accordingly, multiple operating systems may potentially be run concurrently by the computer system 900.

Communications subsystem 924 provides an interface to other computer systems and networks. Communications subsystem 924 serves as an interface for receiving data from and transmitting data to other systems from the computer system 900. For example, communications subsystem 924 may enable the computer system 900 to establish a communication channel to one or more client devices via the Internet for receiving and sending information from and to the client devices.

The communication subsystem 924 may support both wired and/or wireless communication protocols. For example, in certain embodiments, the communications subsystem 924 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some embodiments, the communications subsystem 924 can provide wired network connectivity (e.g., Ethernet) in addition to or instead of a wireless interface.

The communication subsystem 924 can receive and transmit data in various forms. For example, in some embodiments, in addition to other forms, the communications subsystem 924 may receive input communications in the form of structured and/or unstructured data feeds 926, event streams 928, event updates 930, etc. For example, the communications subsystem 924 may be configured to receive (or send) data feeds 926 in real-time from users of social media networks and/or other communication services such as Twitter® feeds, Facebook® updates, web feeds such as Rich Site Summary (RSS) feeds, and/or real-time updates from one or more third party information sources.

In certain embodiments, the communications subsystem 924 may be configured to receive data in the form of continuous data streams, which may include event streams 928 of real-time events and/or event updates 930, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, etc.

The communications subsystem 924 may also be configured to communicate data from the computer system 900 to other computer systems or networks. The data may be communicated in various different forms such as structured and/or unstructured data feeds 926, event streams 928, event updates 930, etc. to one or more databases that may be in communication with one or more streaming data source computers coupled to the computer system 900.

The computer system 900 can be one of various types, including a handheld portable device (e.g., an iPhone® cellular phone, an iPad® computing tablet, a PDA), a wearable device (e.g., a Apple Vision Pro®, Ray-Ban Meta Smart Glasses®, or Google Glass® head mounted display), a personal computer, a workstation, a mainframe, a kiosk, a server rack, or any other data processing system. Due to the ever-changing nature of computers and networks, the description of the computer system 900 depicted in FIG. 9 is intended only as a specific example. Many other configurations having more or fewer components than the system depicted in FIG. 9 are possible. Based on the disclosure and teachings provided herein, a person of ordinary skill in the art will appreciate other ways and/or methods to implement the various embodiments.

The term web server (e.g. cloud service provider) is generally used to indicate a server that hosts a webpage on a user device in response to a web request received from the user device. The term gatekeeper server (e.g. data management platform) is generally used to indicate a dedicated server that provides service to the user. The term source entity (e.g. advertiser, promotor, seller, publisher, Demand Side Platform (DSP) and Supply Side Platform (SSP)) is generally used to indicate a platform owned by a company for providing advertisement to a user through the webpage. The term resource (e.g. digital money, reward, payment, monetary cash, bitcoins, bank account deposits, debit cards, loaded gift cards, store credit, coupons, or discounts) is generally used to indicate a transaction amount provided by the source entity to the user for placing content items on the webpage accessing by the user. The term content item (e.g.

advertisement) is generally used to indicate a promotional text, video, link, or image on the webpage accessed by the user. The term content slot is generally used to indicate a portion of the webpage where the content item is filled when the user is accessing the webpage. The term digital container (e.g. digital wallet) is used to indicate a SSI wallet of a user created for storing digital form of a document, such as a driver's license, a college degree, digital transaction information, etc. The term device identifier or user identifier is used to indicate an identifier assigned to a particular user or a particular device.

Some embodiments of the present disclosure include a system including one or more data processors. In some embodiments, the system includes a non-transitory computer readable storage medium containing instructions which, when executed on the one or more data processors, cause the one or more data processors to perform part or all of one or more methods and/or part or all of one or more processes disclosed herein. Some embodiments of the present disclosure include a computer-program product tangibly embodied in a non-transitory machine-readable storage medium, including instructions configured to cause one or more data processors to perform part or all of one or more methods and/or part or all of one or more processes disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention as claimed has been specifically disclosed by embodiments and optional features, modification and variation of the concepts herein disclosed may be resorted to by those skilled in the art, and that such modifications and variations are considered to be within the scope of this invention as defined by the appended claims.

The present description provides preferred exemplary embodiments only, and is not intended to limit the scope, applicability or configuration of the disclosure. Rather, the present description of the preferred exemplary embodiments will provide those skilled in the art with an enabling description for implementing various embodiments. It is understood that various changes may be made in the function and arrangement of elements without departing from the spirit and scope as set forth in the appended claims.

Specific details are given in the present description to provide a thorough understanding of the embodiments. However, it will be understood that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

What is claimed is:

1. A computer-implemented method comprising:
    receiving, at a gatekeeper server and from a web server, a request for a Self Sovereign Identity (SSI), wherein the request includes at least one of a user identifier and a device identifier;
    obtaining, at the gatekeeper server, data related to privacy of a user associated with the user identifier, from a user device of the user, wherein the data related to privacy of the user indicates agreement or disagreement on sharing at least one of content preferences, user characteristics, and a browsing history;
    querying a data store for instruction data using the data related to privacy of the user and the at least one of the user identifier and the device identifier, wherein the privacy of the user is dynamically updated in the data store based on activities performed by the user on one or more media channels;
    receiving, from the data store and in response to the query, the instruction data, wherein the instruction data authorizes conditioned release of the at least one of the content preferences, the user characteristics, and the browsing history;
    determining, based on the instruction data, a propensity score using an adaptive machine learning model that is trained using user's data periodically obtained through one or more media channels, wherein the propensity score indicates an extent to which a user associated with the at least one of the user identifier and the device identifier has propensity for releasing the user's data to at least one digital platform;
    generating, using the adaptive machine learning model, the SSI based on the propensity score, wherein the SSI is generated for selecting at least one content item to be filled in at least one content slot on a webpage hosted by the web server; and
    transmitting, from the gatekeeper server to the web server, the SSI in response to the request.

2. The computer-implemented method of claim 1, wherein the at least one of the content preferences, the user characteristics, and the browsing history is obtained from one or more user devices associated with the at least one of the user identifier and the device identifier.

3. The computer-implemented method of claim 1, wherein the at least one of the content preferences, the user characteristics, and the browsing history is periodically updated in the data store.

4. The computer-implemented method of claim 1, wherein the user is associated with multiple user identifiers or multiple device identifiers.

5. The computer-implemented method of claim 4, wherein the multiple user identifiers or the multiple device identifiers are linked to a digital container.

6. The computer-implemented method of claim 1, further comprising:
    receiving, from the web server, an identification of a source entity selected from multiple source entities; and
    obtaining, from the source entity, a digital form of a resource against the at least one content slot on the webpage hosted by the web server, wherein the resource is associated with the at least one content item and the at least one content slot assigned to the source entity.

7. The computer-implemented method of claim 6, wherein the resource is stored in a digital container associated with the at least one of the user identifier or the device identifier.

8. The computer-implemented method of claim 7, wherein the resource is associated with a pass to reduce a number of content slots on the webpage.

9. The computer-implemented method of claim 6, wherein the resource is utilized in multiple virtual environments.

10. The computer-implemented method of claim 1, wherein the at least one of the content preferences, the user characteristics, and the browsing history is obtained from one or more media channels to enrich metadata associated with the at least one of the user identifier and the device identifier.

11. A computer-program product tangibly embodied in a non-transitory machine-readable storage medium, including instructions configured to cause one or more data processors to perform a set of actions including:

receiving, at a gatekeeper server and from a web server, a request for a Self Sovereign Identity (SSI), wherein the request includes at least one of a user identifier and a device identifier;

obtaining, at the gatekeeper server, data related to privacy of a user associated with the user identifier, from a user device of the user, wherein the data related to privacy of the user indicates agreement or disagreement on sharing at least one of content preferences, user characteristics, and a browsing history;

querying a data store for instruction data using the data related to privacy of the user and the at least one of the user identifier and the device identifier, wherein the privacy of the user is dynamically updated in the data store based on activities performed by the user on one or more media channels;

receiving, from the data store and in response to the query, the instruction data, wherein the instruction data authorizes conditioned release of the at least one of the content preferences, the user characteristics, and the browsing history;

determining, based on the instruction data, a propensity score using an adaptive machine learning model that is trained using user's data periodically obtained through one or more media channels, wherein the propensity score indicates an extent to which a user associated with the at least one of the user identifier and the device identifier has propensity for releasing the user's data to at least one digital platform;

generating, using the adaptive machine learning model, the SSI based on the propensity score, wherein the SSI is generated for selecting at least one content item to be filled in at least one content slot on a webpage hosted by the web server; and transmitting, from the gatekeeper server to the web server, the SSI in response to the request.

12. The computer-program product of claim 11, wherein the at least one of the content preferences, the user characteristics, and the browsing history is obtained from one or more user devices associated with the at least one of the user identifier and the device identifier.

13. The computer-program product of claim 11, wherein the at least one of the content preferences, the user characteristics, and the browsing history is periodically updated in the data store.

14. The computer-program product of claim 11, wherein the user is associated with multiple user identifiers or multiple device identifiers.

15. The computer-program product of claim 14, wherein the multiple user identifiers or the multiple device identifiers are linked to a digital container.

16. The computer-program product of claim 11, wherein the set of actions further includes:

receiving, from the web server, an identification of a source entity selected from multiple source entities; and obtaining, from the source entity, a digital form of a resource against the at least one content slot on the webpage hosted by the web server, wherein the resource is associated with the at least one content item and the at least one content slot assigned to the source entity.

17. The computer-program product of claim 16, wherein the resource is stored in a digital container associated with the at least one of the user identifier or the device identifier.

18. The computer-program product of claim 17, wherein the resource is associated with a pass to reduce a number of content slots on the webpage.

19. The computer-program product of claim 16, wherein the resource is utilized in multiple virtual environments.

20. The computer-program product of claim 11, wherein the at least one of the content preferences, the user characteristics, and the browsing history is obtained from one or more media channels to enrich metadata associated with the at least one of the user identifier and the device identifier.

21. A system comprising:

one or more processors;

one or more non-transitory computer-readable media storing instructions, which, when executed by the system, cause the system to perform a set of actions including:

receiving, at a gatekeeper server and from a web server, a request for a Self Sovereign Identity (SSI), wherein the request includes at least one of a user identifier and a device identifier;

obtaining, at the gatekeeper server, data related to privacy of a user associated with the user identifier, from a user device of the user, wherein the data related to privacy of the user indicates agreement or disagreement on sharing at least one of content preferences, user characteristics, and a browsing history;

querying a data store for instruction data using the data related to privacy of the user and the at least one of the user identifier and the device identifier, wherein the privacy of the user is dynamically updated in the data store based on activities performed by the user on one or more media channels;

receiving, from the data store and in response to the query, the instruction data, wherein the instruction data authorizes conditioned release of the at least one of the content preferences, the user characteristics, and the browsing history;

determining, based on the instruction data, a propensity score using an adaptive machine learning model that is trained using user's data periodically obtained through one or more media channels, wherein the propensity score indicates an extent to which a user associated with the at least one of the user identifier and the device identifier has propensity for releasing the user's data to at least one digital platform;

generating, using the adaptive machine learning model, the SSI based on the propensity score, wherein the SSI is generated for selecting at least one content item to be filled in at least one content slot on a webpage hosted by the web server; and transmitting, from the gatekeeper server to the web server, the SSI in response to the request.

* * * * *